(12) United States Patent
Westberg (10) Patent No.: US 6,195,353 B1
(45) Date of Patent: Feb. 27, 2001

(54) SHORT PACKET CIRCUIT EMULATION

(75) Inventor: Lars Westberg, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/851,714

(22) Filed: May 6, 1997

(51) Int. Cl.[7] ................................................. H04L 12/28
(52) U.S. Cl. ............................................. 370/395; 370/396
(58) Field of Search .................................. 370/395, 396, 370/398, 351, 356, 464, 472, 473, 474, 468, 469, 470

(56) References Cited

U.S. PATENT DOCUMENTS

| | | |
|---|---|---|
| 5,509,007 | 4/1996 | Takashima et al. . |
| 5,699,345 * | 12/1997 | Watanuki ........................... 370/232 |
| 5,774,469 * | 6/1998 | Wirkestrand ....................... 370/473 |
| 5,802,051 * | 9/1998 | Petersen ............................. 370/395 |
| 5,805,588 * | 9/1998 | Petersen ............................. 370/356 |
| 5,822,321 * | 10/1998 | Petersen ............................. 370/474 |
| 6,041,039 * | 3/2000 | Kilkki ................................. 370/230 |

FOREIGN PATENT DOCUMENTS

WO95/34977   12/1995   (WO) .

OTHER PUBLICATIONS

Hitoshi Uematsu et al., "Implementation and Experimental Results of CLAD Using SRTS Method in ATM Networks", Proceedings of the Global Telecommunications Conference (GLOBECOM), San Francisco, Nov. 28–Dec.2, 1994, vol. 3 of 3, Nov. 28, 1994, pp. 1815–1821, XP000488836, Institute of Electrical and Electronics Engineers.

A. Ott et al., Prototype ATM LAN System Multimedia on Demand Applications, NEC Research and Development, vol. 35, No. 4, Oct. 1, 1994, Tokyo, Japan, XP000495856, pp. 366–373.

* cited by examiner

Primary Examiner—Douglas W. Olms
Assistant Examiner—Ricardo M. Pizarro
(74) Attorney, Agent, or Firm—Burns, Doane, Swecker & Mathis, L.L.P.

(57) ABSTRACT

Transportation of low bit rate, circuit emulation data over an asynchronous transfer mode (ATM) connection is improved by packetizing the circuit emulation data into short packets in accordance with a packetization clock. The packetization clock is derived as a function of the ATM cell shaping clock. The short packets are then multiplexed together into a single ATM connection and transported to a receiving unit in accordance with an ATM cell shaping clock. The circuit emulation data is then extracted at the receiving unit and forwarded to the corresponding circuit emulation connection at the appropriate service rate, which is recovered based on ATM connection characteristics.

52 Claims, 10 Drawing Sheets

SHORT PACKET CIRCUIT EMULATION

BACKGROUND

The present invention relates to telecommunication systems in which asynchronous transfer mode (ATM) is used for transporting voice-type data as well as other types of data, for example, video and control data. More particularly, the present invention relates to a telecommunication system in which ATM is used for transporting low bit rate, circuit emulation data (i.e., synchronous data) from one or more circuit emulation connections (i.e., circuit emulation data sources).

ATM is a standard protocol that is commonly used for transmitting asynchronous telecommunication data within a telecommunication system for one or more applications. ATM is based on the transmission of data in fixed size data packets known as ATM cells. The protocol for each ATM cell is the same, wherein, each ATM cell contains a 48 octet payload and a 5 octet header. In general, ATM is well known in the art.

Figure 1:
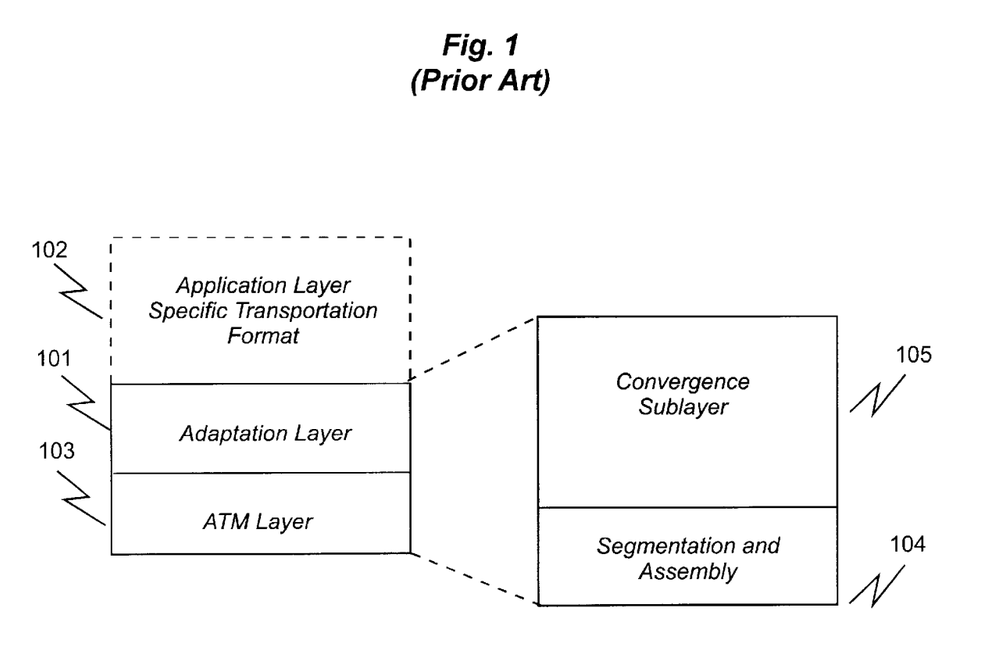
FIG. 1 depicts the asynchronous transfer mode (ATM) adaptation layer (AAL) in accordance with the prior art.

The telecommunication data associated with each application is initially in a data transfer format that is application specific. If ATM is to be used for transporting the data, the application specific data format is adapted so that it is compatible with the ATM protocol. This is accomplished by an ATM adaptation layer (AAL) 101, as illustrated in FIG. 1. Referring now to FIG. 1, the application layer 102 represents telecommunication data arriving from a specific telecommunication data application. The task of the AAL 101, as mentioned, is to reformat the data so the data is compatible with the ATM protocol. Once reformatted, the ATM layer 103 can transport the data to a desired receiving unit.

One of the more common AALs is AAL1. AAL1 is typically used to packetize synchronous data (i.e., circuit emulation data) into standardized data packets, which can, in turn, be structured or unstructured data. Structured data is organized into a sequence of data blocks, wherein the boundary for each data block is defined by a structured data pointer (SDP). The SDP is specifically used for alignment (i.e., recovery) of the data at a receiving unit. Unstructured data refers to raw data that includes no framing information.

AAL1 is divided into two basic functional sublayers, as illustrated in FIG. 1: a segmentation and reassembly (SAR) sublayer 104 and a convergence sublayer 105. The SAR sublayer 104 packetizes the incoming data into data blocks that are 47 bytes in length. The SAR sublayer 104 then adds a 1 byte sequence number and a 1 bit data type identifier (to identify the incoming data as either structured or unstructured). For example, if the data type identifier bit is set, the first byte in the block will contain a SDP. The convergence sublayer supports data packetization, clock recovery, cell delay variation compensation and forward error correction.

There are a number of inherent problems associated with AAL1. Foremost is that the time delay required by AAL1 to prepare a 47 byte data block is excessively long. For example, a typical service rate (i.e., the incoming data rate) for circuit emulation data is 64 kbits per second. The corresponding time delay for AAL1 would be approximately 6 milliseconds (i.e., 47 bytes/8 kbytes per second). Moreover, the transportation of data from a sending unit to a receiving unit typically involves several ATM transitions; thus, the already excessive delay is compounded with each ATM transition. In addition, when dealing with low bit rate data, there is often an insufficient amount of data to completely fill each ATM cell. Pursuant to the ATM cell protocol, the AAL1 may have to fill the remaining portion of each ATM cell with padding bits. This, in turn, results in poor bandwidth utilization. Since many applications, such as voice data, are highly sensitive to data transportation delays, and because bandwidth is very expensive, there is a real need to design a more efficient way to transport low bit rate, circuit emulation data using ATM.

SUMMARY OF INVENTION

Figure 2:
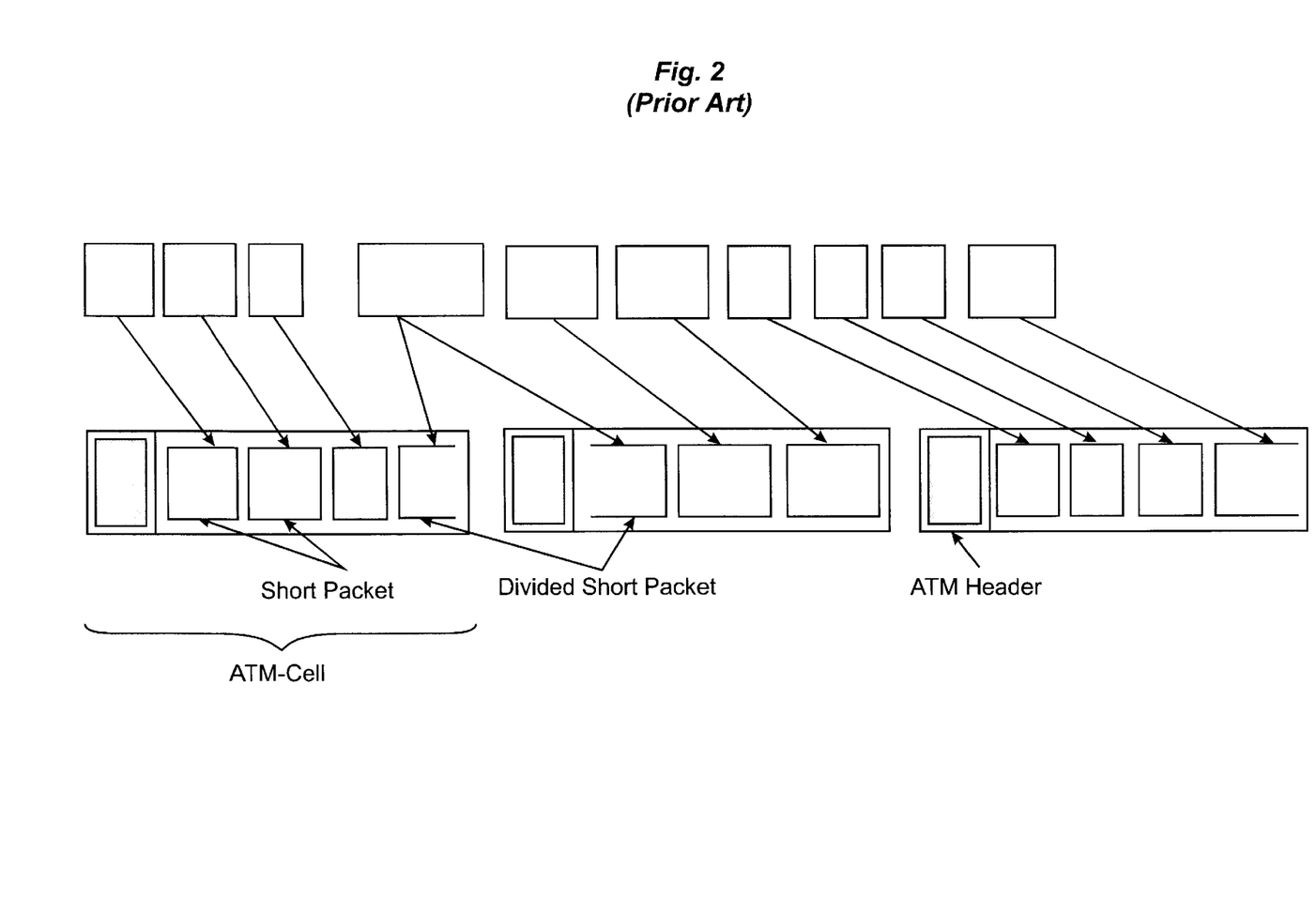
FIG. 2 illustrates the multiplexing of short packets into ATM cells in accordance with the prior art.

Another commonly employed AAL is AAL2, which is sometimes referred to as AALm. AAL2, is typically used to transform low bit rate, asynchronous data, such as cellular voice data. More particularly, AAL2 segments low bit rate data streams into small data packets, which are often called minicells or microcells. The small data packets from a particular low bit rate, asynchronous data source are then multiplexed together with small packets from other similar data sources to form ATM cells. By segmenting the data into smaller, variable size data packets and by multiplexing the small packets from multiple data sources, data transportation delays are reduced and bandwidth utilization is improved. In addition, transportation delays can be further reduced and bandwidth utilization further improved by allowing the small data packets to overlap between adjacent ATM cells, as illustrated in FIG. 2.

Figure 3:
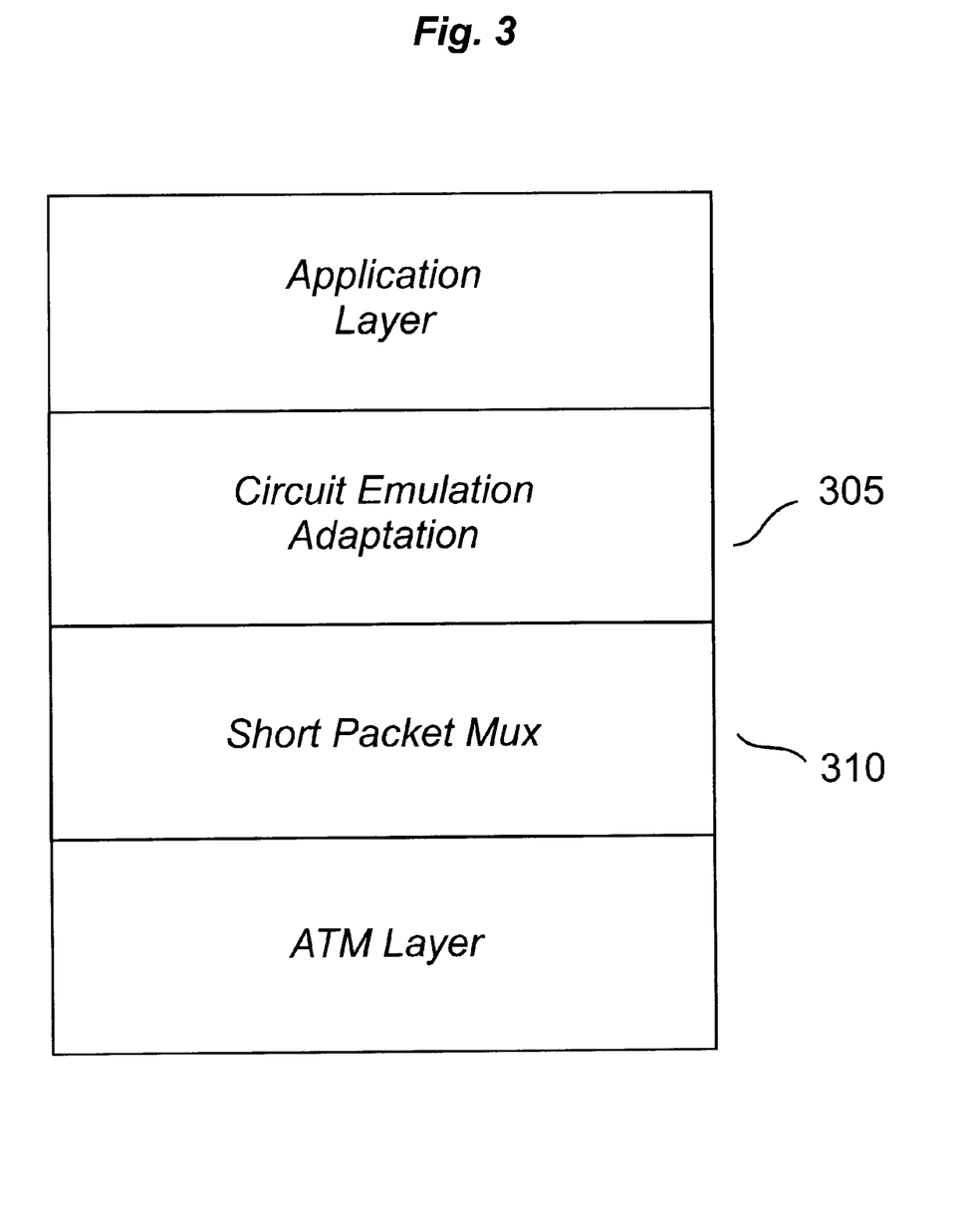
FIG. 3 depicts an AAL in accordance with the present invention.

The present invention improves the ATM performance for circuit emulation data using the functional capabilities associated with AAL2. Hence, the present invention is essentially an enhanced version of AAL2, and the present invention is herein referred to as the circuit emulation adaptation layer. In accordance with FIG. 3, the present invention is achieved by replacing the AAL 101, illustrated in FIG. 1, with a circuit emulation adaptation layer 305 and a short packet multiplexing layer 310, wherein the latter is functionally similar or identical to the AAL2 described above.

Accordingly, it is an object of the present invention to packetize the low bit rate, circuit emulation data before transporting the data over an ATM connection.

It is another object of the present invention to improve bandwidth utilization when transporting circuit emulation data over an ATM connection.

In accordance with one aspect of the invention, the foregoing and other objects are achieved by an apparatus, system and/or method for transporting circuit emulation data. This involves the transformation of emulation data into a sequence of circuit emulation data packets, and then the insertion of the sequence of circuit emulation data packets into a data transfer cell. Next, the data transfer cell is transported to a receiving unit as a function of a data transfer cell shaping clock. In addition, the length of each data packet is controlled as a function of the data transfer cell shaping clock.

In accordance another aspect of the invention, the foregoing and other objects are achieved by an apparatus, system and/or method for transporting circuit emulation data. This involves transforming the circuit emulation data into a sequence of circuit emulation data packets and inserting the sequence of circuit emulation data packets into a data transfer cell. Then the data transfer cell is transported to a receiving unit. Here, data packet length is controlled as a function of the service rate clock.

BRIEF DESCRIPTION OF THE DRAWINGS

The objects and advantages of the invention will be understood by reading the following detailed description in conjunction with the drawings in which.

DETAILED DESCRIPTION

Figure 4:
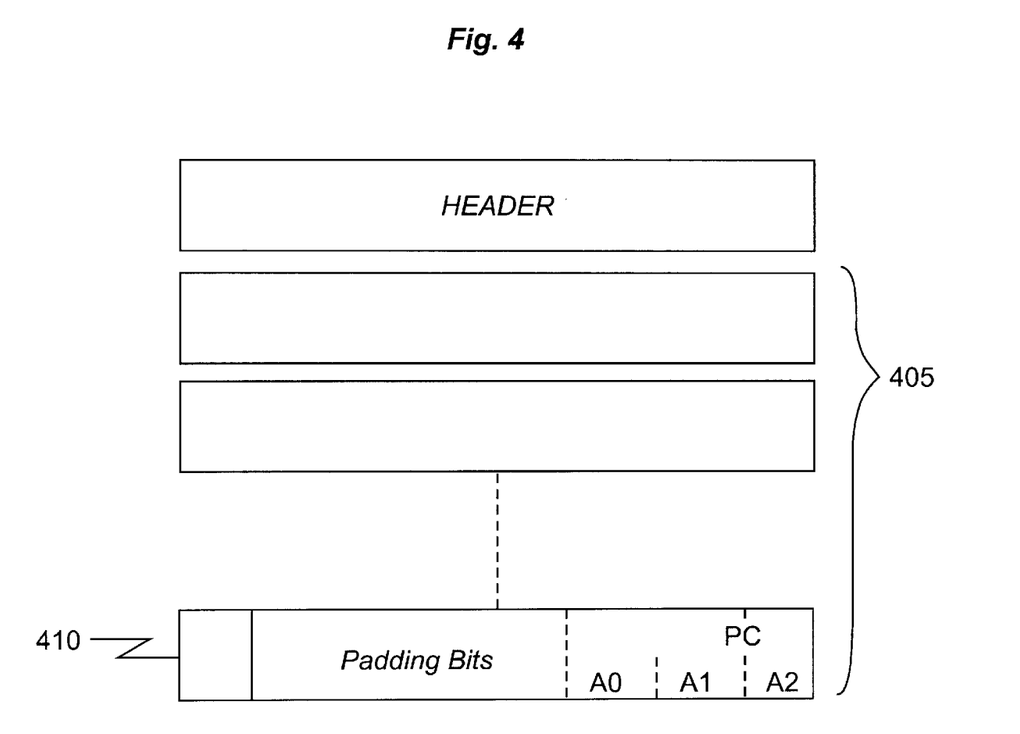
FIG. 4 illustrates a short packet including a header and padding information.

The present invention more efficiently transports low bit rate, circuit emulation (i.e., synchronous) data from a sending unit to a receiving unit over an ATM connection. In general, the present invention accomplishes this by packetizing incoming circuit emulation data into one or more short packets, for example, short packet 405 which comprises a number of data bytes including a last data byte 410, as illustrated in FIG. 4. Since the length of each short packet is typically much shorter than the length of a single ATM cell payload, a sequence of short packets containing circuit emulation data from a particular circuit emulation connection (i.e., data source) can be inserted into the payload of a single ATM cell. Quite often, the number of short packets in a sequence generated by a particular circuit emulation connection will not completely fill the current ATM cell payload. To maximize bandwidth utilization, and to reduce data transportation delays, the present invention, unlike AAL1, has the ability to multiplex several short packet sequences on the same ATM connection, wherein each short packet sequence corresponds to a different circuit emulation connection and/or a connection involving a different type of traffic (e.g., data control signals, coded speech).

This does not mean that the present invention completely avoids the use of padding bits. However, if padding bits are needed, the present invention only uses them to fill the remaining portion of a short packet, for example, the last data byte 410 in the short packet 405, as illustrated in FIG. 4. Also, if padding bits are utilized, one skilled in the art will readily appreciate that a padding counter (PC) 415 can be included so that the receiving unit can properly identify them and discard them. For purposes of illustration, the PC 415 comprises 3 bits A0, A1, A2. Accordingly, PC 415 can define as many as 8 padding bits.

Figure 5A:
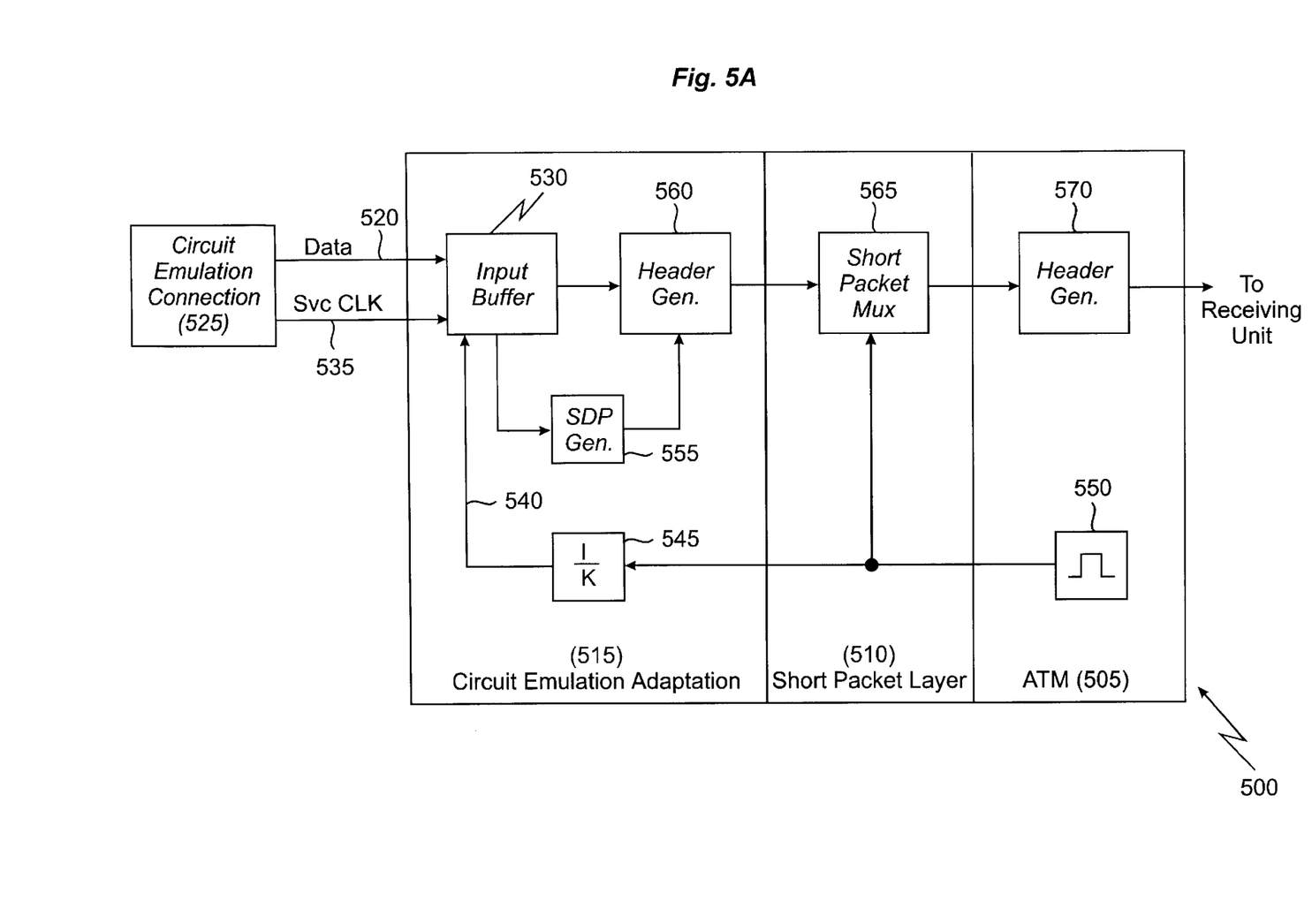
FIGS. 5A and 5B illustrate the functional layers of the present invention at a sending unit.

FIG. 5A illustrates the functional layers and elements of an exemplary embodiment 500 of the present invention with respect to a telecommunication system sending unit. The three functional layers include the ATM layer 505, the short packet layer 510, and the circuit emulation adaptation layer 515. As previously mentioned, the present invention replaces the AAL 101 with a short packet layer and a circuit emulation adaptation layer.

The exemplary embodiment 500 operates as follows. Circuit emulation data 520, from a particular circuit emulation connection 525, is clocked into an input buffer 530, located in the circuit emulation adaptation layer 515, by a service clock (SVC CLK) 535. The input buffer 530 is a hardware component comprising a number of shift registers which perform a serial to parallel conversion.

The SVC CLK 535 functions at a particular clock rate, and it may be accompanied by a frame clock (not shown), if the circuit emulation data is structured data. The purpose of the frame clock is to identify the beginning of each data frame. Hence, the frame clock frequency will be a derivative of the service clock frequency.

The circuit emulation adaptation layer 515 also includes a packetization clock. More specifically, it includes a packetization clock signal 540. In one embodiment, the packetization clock signal 540 is derived by applying a frequency divider 545 to the signal produced by the ATM cell shaping clock 550, which is maintained in the ATM layer 505. As illustrated in FIG. 5A, the signal produced by the ATM cell shaping clock 550 is divided by a value K, which is an operator adjustable variable. Therefore, the operator can control the period of the packetization clock by adjusting the value of K. Since the length of the short packets is a function of the packetization clock period, the operator can control the length of the short packets extracted from the input buffer 530. Note, the length of the short packets is also a function of the service clock rate. For example, as the packetization clock period increases, so too will the length of the short packets. Likewise, as the service rate increases, so too will the length of the short packets.

Figure 5B:
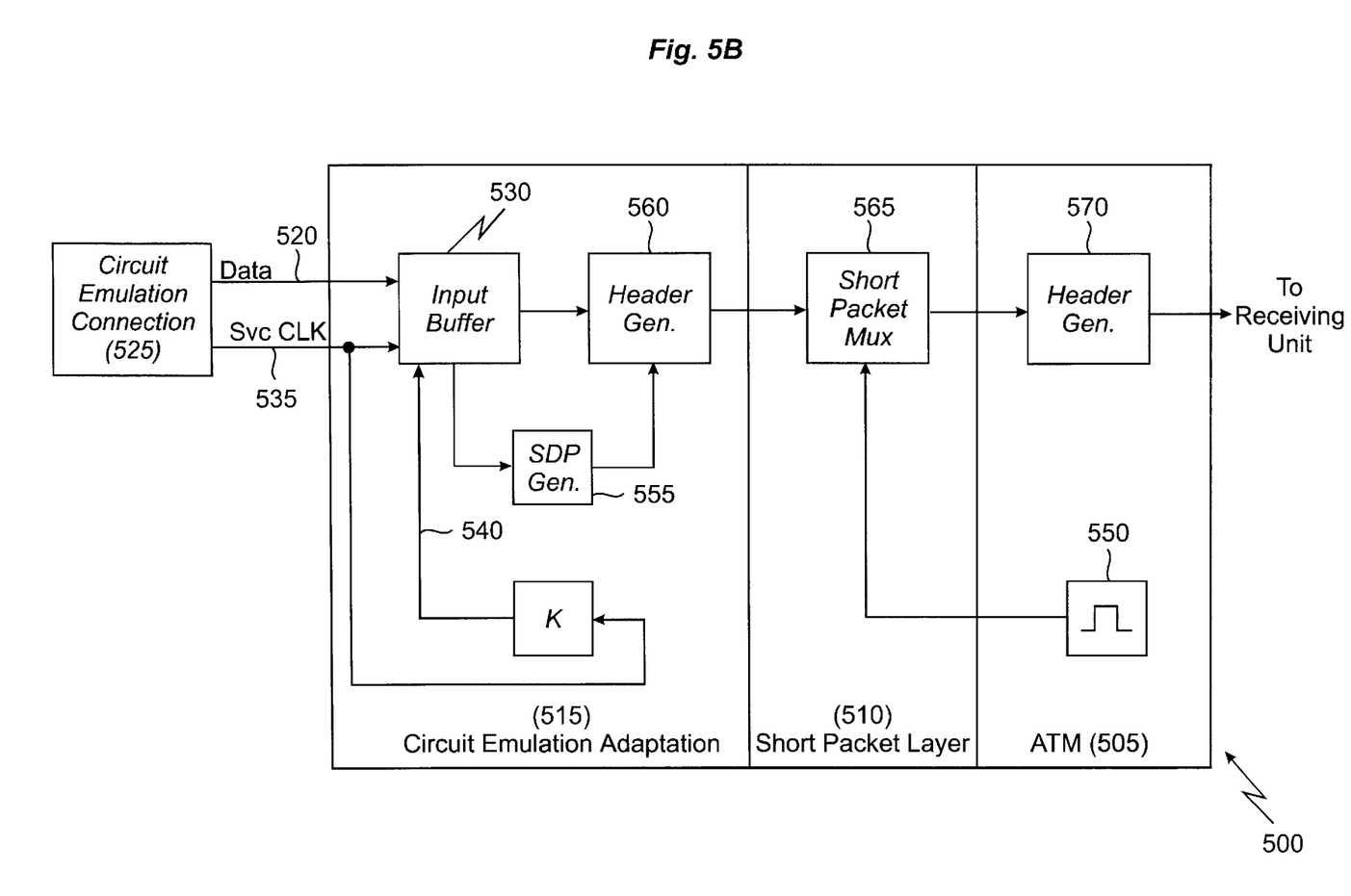

In a second embodiment, as illustrated in FIG. 5B, the packetization clock signal 540 is derived by applying a factor K to the signal produced by the SVC CLK 535. Again, the operator would be able to control the period of the packetization clock signal 540 by adjusting the value of K.

If the circuit emulation data is structured data, a sequence of short packets will be passed from the input buffer 530 to a SDP generation unit 555. The SDP generation unit will produce a SDP which, as explained previously, is used for maintaining the alignment of data frames at the receiving unit. If the circuit emulation data is unstructured data, the sequence of short packets will be passed from the input buffer 530 directly to the header generation unit 560. The header generation unit then generates a header 420 for each short packet 405. The header may include, for example, the SDP (if one is required), a sequence counter, a data type identifier, and a circuit emulation connection identifier.

The sequence of short packets is then forwarded to the short packet multiplexer 565. The short packet multiplexer then multiplexes the sequence of short packets containing circuit emulation data from circuit emulation connection 525 into the ATM cell stream along with short packets containing data from other connections (not shown), including circuit emulation connections and/or connections carrying other types of traffic (e.g., control signals and compressed voice). Since the short packet multiplexer 565 multiplexes short packets from numerous connections, each of which may be sending short packets simultaneously, the order in which the short packet multiplexer 565 multiplexes the short packets is determined by a programmed priority schedule, which defines the relative transmission priority for each short packet. By multiplexing circuit emulation data into a single ATM cell, with short packets from other connections, the present invention decreases overall transmission delays and increases bandwidth utilization.

It is well recognized by those skilled in the art that the ATM layer 505 can support several different kinds of bandwidth allocation, or traffic service categories such as constant bit rate (CBR) services, variable bit rate (VBR) services, available bit rate (ABR) services, and unspecified bit rate (UBR) services. In accordance with a preferred embodiment of the present invention, ATM cells are dispatched from the sending unit and constant, peak cell rate allocation is controlled by the ATM cell shaping clock 550. Since the packetization clock signal 540 is derived directly from the ATM cell shaping clock 550, there is less potential for interference between the generation of short packets and the generation of ATM cells.

When the ATM cell shaping clock 550 signifies that the current ATM cell is to be transported, a header generation unit 570 in the ATM layer 505 will cause a standard ATM cell header to be appended to the payload of the current ATM cell. The ATM cell header and payload are then transported to the appropriate receiving unit. One of skill in the art will readily appreciate that the ATM cell could transition through a number of different ATM-switches before arriving at the desired receiving entity. Each of these ATM-switches would result in additional transportation delays independent of the present invention.

Figure 6:
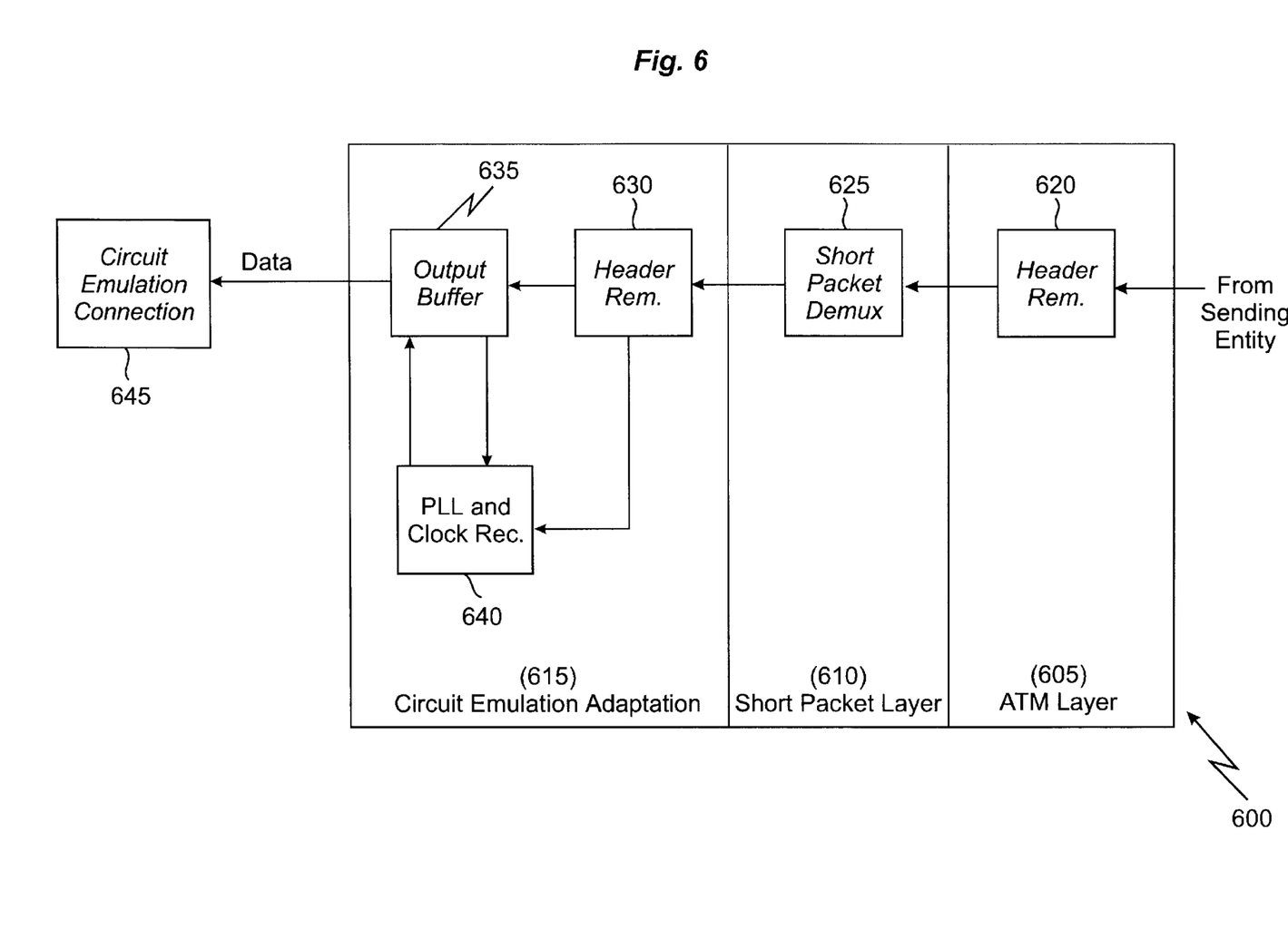
FIG. 6 illustrates the functional layers of the present invention at a receiving unit.

FIG. 6 depicts the functional layers of the present invention, with respect to the receiving unit, in accordance with an exemplary embodiment 600. As in the sending unit, the functional layers include an ATM layer 605, a short packet layer 610, and a circuit emulation adaptation layer 615. Again, the present invention replaces the AAL 101 with the short packet layer 610 and the circuit emulation adaptation layer 615.

The exemplary embodiment 600 operates as follows. The ATM layer 605 receives an incoming ATM cell from the sending unit, wherein an ATM header removal unit 620 removes the ATM cell header from the current incoming ATM cell payload, and then passes the payload onto the short packet demultiplexer 625 located in the short packet layer 610. The short packet demultiplexer 625 separates the short packet sequences according to their corresponding connections, which may include one or more circuit emulation connections. The short packets are then forwarded to the appropriate adaptation layer. Short packets containing circuit emulation data are passed to a circuit emulation adaptation layer, e.g., circuit emulation adaptation layer 615.

In the circuit emulation adaptation layer 615, a short packet header removal unit 630 removes the header from each short packet. The header removal unit 630 is also responsible for extracting the SDP if the corresponding sequence of short packets contains structured data. The header removal unit 630 then sends the short packets, and the SDP if the short packets contain structured data, to the output buffer 635. The output buffer 635 utilizes the SDP to segment the blocks of data and to generate a block rate clock. For example, if standard PDH/SDH lines are being emulated, the SDP will be used to identify 0.125 microsecond frame borders. The output buffer 635 is a hardware component comprising a series of shift registers that performs a parallel to serial data transformation.

The header removal unit 630 is also responsible for transmitting a clock recovery initiation pulse to the clock recovery unit 640 if the corresponding sequence of short packets contains unstructured data. Whether the sequence of short packets contain structured or unstructured data, the clock recovery unit, in turn, controls the rate at which data is transferred from the output buffer 635 to the circuit emulation connection 645. To accomplish this, the clock recovery unit 640 regenerates (i.e., recovers) the rate of the service clock 535 so that the circuit emulation data is transferred to the corresponding circuit emulation connection 645 at the required data rate. The clock recovery unit can regenerate the service clock rate in a number of different ways.

The clock recovery unit 640, in a preferred embodiment, regenerates the service clock rate by extracting the service clock rate from the ATM stream as a function of the ATM cell arrival rate distribution, wherein the ATM cell arrival rate distribution directly reflects the frequency of the ATM cell shaping clock 550. The clock recovery unit 640 can then use the ATM cell arrival rate distribution and the value of K to determine the frequency of the packetization clock ($P_{CLK}$) signal 540. The clock recovery unit 640 then determines the rate of the service clock in accordance with the following relationship:

$$SVC_{CLK}=N_{VAR}*P_{CLK}=N_{VAR}*SH_{CLK}/K \qquad (1)$$

wherein $SVC_{CLK}$ represents the service clock rate, $P_{CLK}$ represents the packetization clock rate, $SH_{CLK}$ represents the shaping clock rate, and $N_{VAR}$ represents the size of the short packets. Because $N_{VAR}$ can vary due to fluctuations in the frequency of the service clock and the frequency of the shaping clock $SH_{CLK}$, a service clock estimate is smoothed by a low pass filter, thus helping to attenuate packet size jitter.

With respect to structured data, the service block rate is derived in accordance with the following relationship.

$$SVC_{BLK}=N_{VAR}/N_{BLK}*P_{CLK}=N_{VAR}/N_{BLK}*SH_{CLK}/K \qquad (2)$$

The block size $N_{BLK}$ is derived in accordance with the SDP, which is extracted by the header removal unit 640 as explained above. The block rate is also independent of block size which implies that the number of time slots for standard circuit emulation of a PDH/SDH connection could be changed without dramatically re-synchronizing the service block-rate clock.

The clock recovery method described above is advantageous over prior clock recovery methods because this method relies exclusively on the characteristics of the ATM layer 605, which already accommodate for delay variations caused by the multiplexing of short packets. Accordingly, the clock recovery unit 640 can more accurately compute the service clock rate.

Nevertheless, the clock recovery unit 640 could recover the service clock in accordance with any number of prior methods, particularly those most often used in conjunction with AAL1. In accordance with one such clock recovery method, the service clock is recovered from an external network clock. There is no internal clock recovery required with this method. Another prior method for recovering the service clock is the Adaptive Clock Recovery method. This method involves measuring the average output buffer fill level, then utilizing the measurement to adjust the phase-locked loop (PLL) in the clock recovery unit 640. Yet another prior technique for recovering the service clock is the Synchronous Residual Time Stamp method. This method involves measuring the difference between a stable system clock and the service clock, then using the measurement to adjust the PLL. These methods are well known in the art.

Although each of the above-identified prior methods could be used for clock recovery, there is less delay variation with the present invention. This is due to the fact that the packetization clock 540 is derived from the ATM cell shaping clock 550, in at least one of the above-identified embodiments. Therefore, clock recovery performance is primarily dependent upon the transmission characteristics at the ATM layer 103 rather than the performance characteristics of the AAL.

Figure 7A:
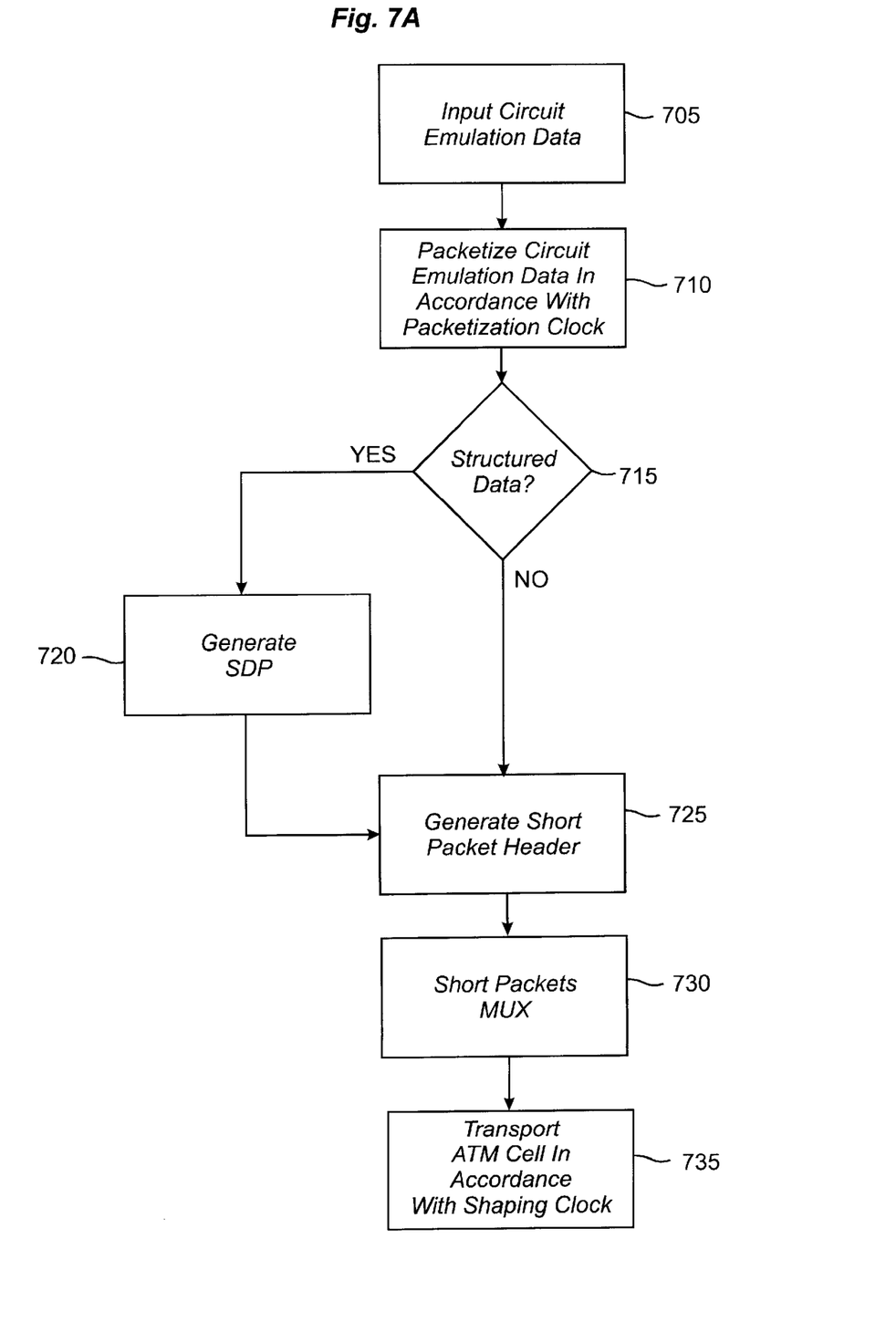
FIGS. 7A and 7B are flowcharts depicting a technique for transporting low bit rate, circuit emulation data.

FIG. 7 is a flowchart depicting the method steps for transporting low bit rate, circuit emulation data from a sending unit to a receiving unit in accordance with a preferred embodiment of the present invention. As illustrated in block 705, circuit emulation data 520 is first shifted into an input buffer 530 in the circuit emulation data adaptation layer 515 at a rate that is governed by the service clock 535. The circuit emulation data 520 is then segmented, if necessary, and packetized into one or more short packet payloads, as shown in block 710. Bit padding may be added, if necessary, as explained above, to maintain byte alignment. Segmentation and, therefore, the size of the short packet payloads are controlled by a packetization clock signal 540, which is derived from an ATM cell shaping clock 550 in the ATM layer 505 or from service clock 535.

The next step depends upon whether the circuit emulation data 520 is structured data or unstructured data, as illustrated by decision block 715. If the circuit emulation data 520 is structured data, in accordance with the "YES" path out of decision block 715, the circuit emulation adaptation layer 515 will generate a SDP, as shown in block 720, which is subsequently used at the receiving unit to maintain data block and/or data frame alignment. The circuit emulation adaptation layer 515 then generates a header for the one or more short packets, in accordance with block 725. If the circuit emulation data 520 is not structured data, in accordance with the "NO" path out of decision block 715, the circuit emulation adaptation layer will simply generate a header, as shown in block 725, without first generating a SDP.

Figure 7B:
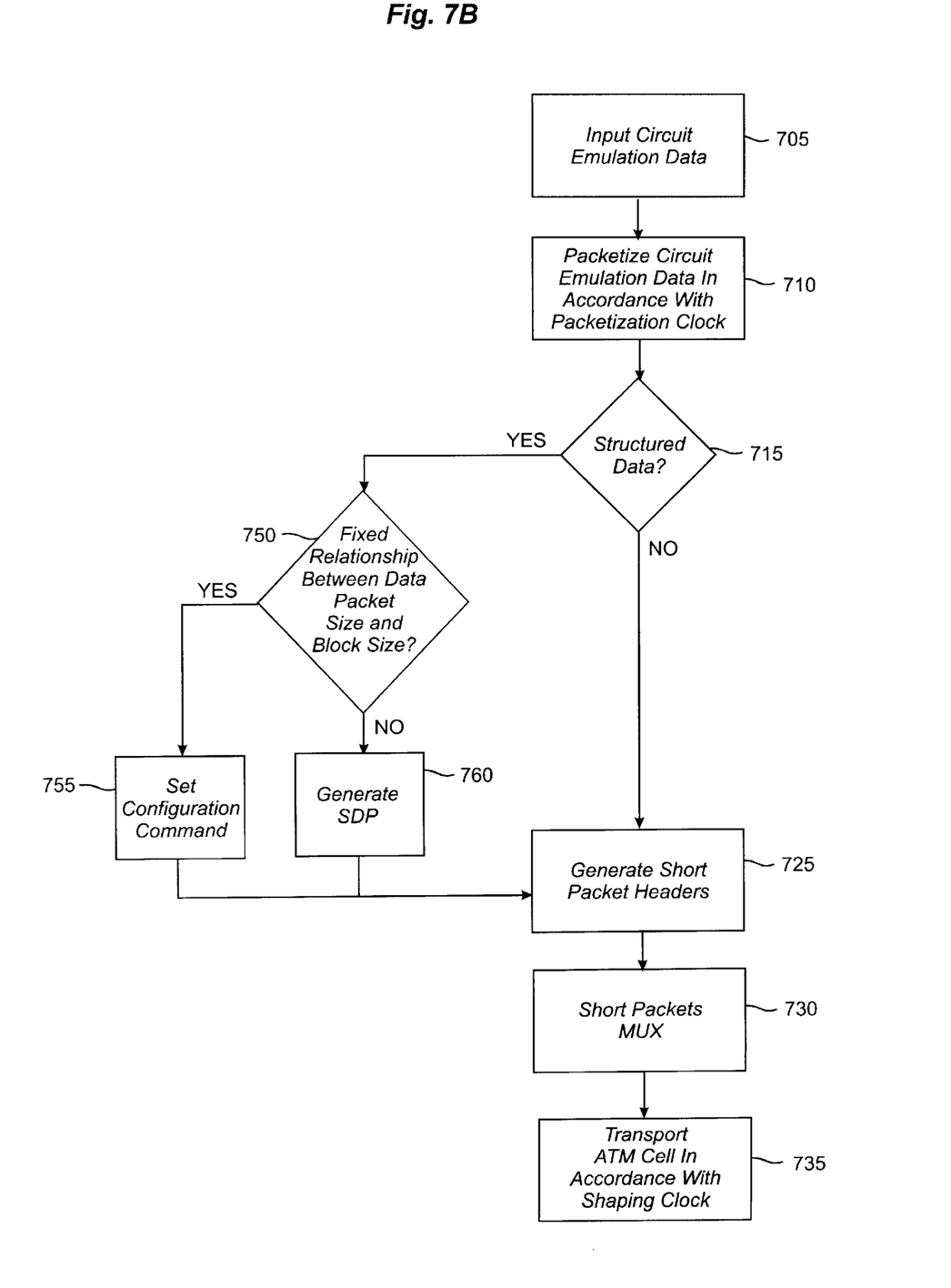

The generation of a SDP depends upon whether the circuit emulation data is structured. Alternatively, the generation of a SDP may depend upon whether there is a fixed relationship between data packet size and block size. If there is no relationship, then a SDP will be generated, as explained above, and as illustrated in FIG. 7B (blocks 750 and 760). If, however, there is a fixed relationship between data packet size and block size, then the function of the SDP can be accomplished by setting a system configuration command, for example, through software controls, as illustrated in FIG. 7B (blocks 750 and 755). By not generating and transporting a SDP, valuable bandwidth is preserved for data and/or other important overhead information.

Once the headers have been generated for the one or more short packets, the header and the packetized data are then forwarded to the short packet layer 510, wherein the packetized data is multiplexed together with short packets generated by other connections, as illustrated in block 730. As mentioned above, the order in which the short packets from each connection are multiplexed into the ATM stream will depend upon a preestablished priority schedule. ATM cells are then formed and dispatched to the desired receiving unit as a function of the ATM cell shaping clock 550, in accordance with block 735.

Figure 8:
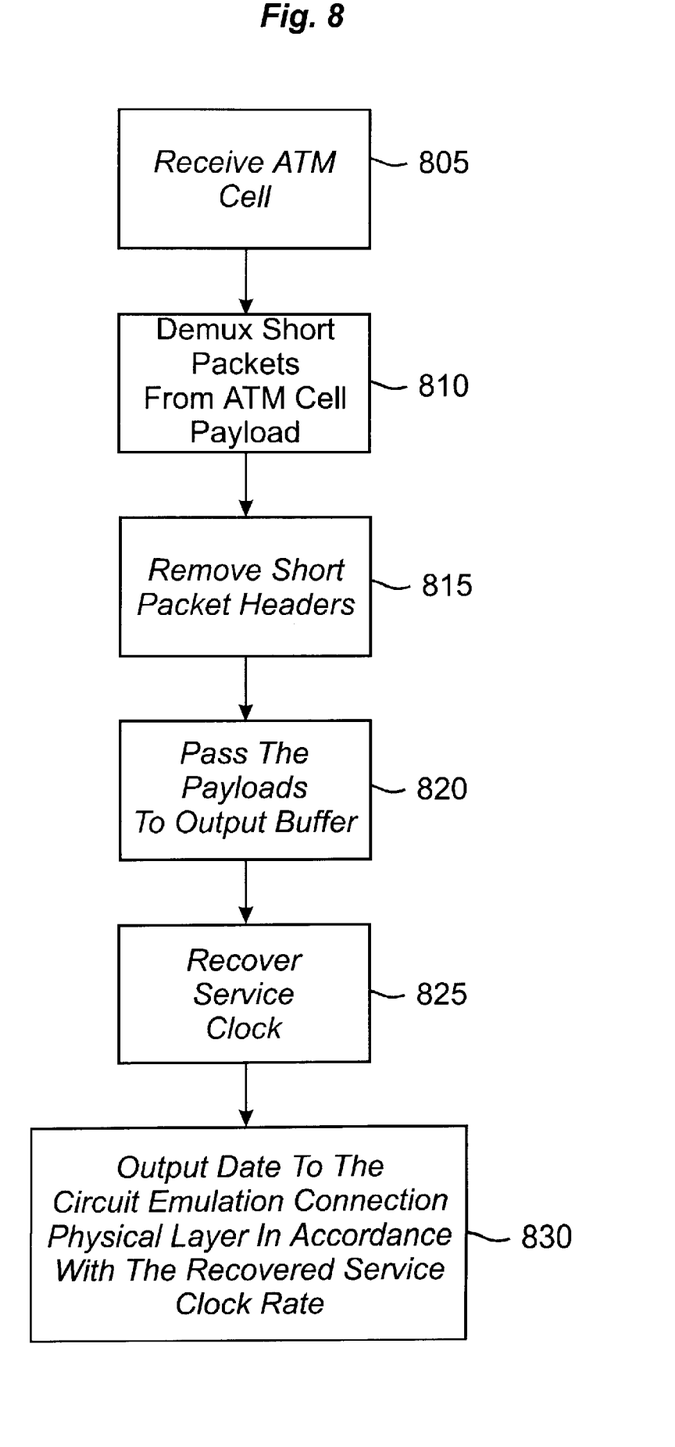
FIG. 8 is a flowchart depicting a technique for receiving low bit rate, circuit emulation data.

FIG. 8 is a flowchart depicting the method steps for receiving ATM cells at a receiving unit and for extracting the low bit rate, circuit emulation data from the sequence of short packets so that it can be properly forwarded to the circuit emulation connection 645, in accordance with a preferred embodiment of the present invention.

The method illustrated in FIG. 8 proceeds as follows. In accordance with block 805, an ATM cell is received by the ATM layer 605, which removes the ATM cell header and forwards the ATM cell payload to the short packet layer 610. The short packets are then demultiplexed by the short packet demultiplexer 625 according to their respective circuit emulation connections, as illustrated by block 810. The short packet demultiplexer 625 then forwards each sequence of short packets to a corresponding circuit emulation adaptation layer 615, where the headers are removed for each short packet, in accordance with block 815. The corresponding short packet payloads are then directed to an output buffer 635, as shown in block 820, and a clock recovery trigger signal is issued to initiate the process of recovering the service clock (i.e., regenerating the service clock rate), as shown in block 825. Once the service clock has been recovered, the circuit emulation adaptation layer 615 will forward the circuit emulation data from the output buffer 635 to the circuit emulation connection 645, at the appropriate service rate, in accordance with block 830. It should be noted that the service clock can be recovered in accordance with any one of a number of different methods as explained above. However, in a preferred embodiment, the service clock is extracted as a function of the ATM layer characteristics, as explained above.

The present invention has been described with reference to a preferred embodiment. However, it will be readily apparent to those skilled in the art that it is possible to embody the invention in specific forms other than the preferred embodiment described above. This may be done without departing from the spirit of the invention. The preferred embodiment is illustrative and should not be considered restrictive in any way. The scope of the invention is given by the appended claims, rather than the preceding description, and all variations and equivalents which fall within the range of the claims are intended to be embraced therein.

What is claimed is:

1. An apparatus for transporting circuit emulation data comprising:

data packet generation means for packetizing the circuit emulation data into a sequence of circuit emulation data packets;

data multiplexing means for inserting the sequence of circuit emulation data packets into a data transfer cell; and means for transporting the data transfer cell to a receiving unit as a function of a data transfer cell shaping clock, wherein said data packet generation means controls data packet length as a function of the data transfer cell shaping clock.

2. The apparatus of claim 1, wherein said data multiplexing means comprises:

means for multiplexing data packets from a plurality of connections into the data transfer cell in accordance with a transmission priority schedule.

3. The apparatus of claim 1, wherein said data packet generation means comprises:

an input buffer for receiving circuit emulation data from a circuit emulation connection; and an input buffer clock for controlling the length of each circuit emulation data packet, wherein said input buffer is responsive to said input buffer clock.

4. The apparatus of claim 3, wherein said input buffer clock comprises:

means for receiving a clock signal from the data transfer cell shaping clock; and frequency divider means for dividing the frequency of the data transfer cell shaping clock signal.

5. The apparatus of claim 1, wherein the data transfer cell is an asynchronous transfer mode (ATM) cell.

6. The apparatus of claim 1, wherein the circuit emulation data is structured data.

7. The apparatus of claim 6, wherein said data packet generation means comprises:

means for inputting a block of structured circuit emulation data from a circuit emulation data connection; and means for generating a structured data pointer if there is no fixed relationship between data block length and data packet length.

8. The apparatus of claim 6, wherein said data packet generation means comprises:

means for inputting a block of circuit emulation data from a circuit emulation data connection; and means for generating a configuration command reflecting a fixed relationship between data block length and data packet length.

9. The apparatus of claim 1, wherein the circuit emulation data is unstructured data.

10. An apparatus for transporting circuit emulation data comprising:

input means for transferring the circuit emulation data from a circuit emulation connection into said apparatus in accordance with a service rate clock;

data packet generation means for packetizing the circuit emulation data into a sequence of circuit emulation data packets;

data multiplexing means for inserting the sequence of circuit emulation data packets into a data transfer cell; and means for transporting the data transfer cell to a receiving unit, wherein said data packet generation means controls data packet length as a function of the service rate clock.

11. The apparatus of claim 10, wherein said data packet generation means comprises:

an input buffer for receiving the circuit emulation data from the circuit emulation connection; and an input buffer clock for controlling the length of each circuit emulation data packet, wherein said input buffer is responsive to said input buffer clock.

12. The apparatus of claim 11, wherein said input buffer clock comprises:

means for receiving a clock signal from the service rate clock; and frequency divider means for dividing the frequency of the service rate clock signal.

13. The apparatus of claim 10, wherein said data multiplexing means comprises:

means for multiplexing data packets from a plurality of connections into the data transfer cell in accordance with a transmission priority schedule.

14. The apparatus of claim 13, wherein the data transfer cell is an asynchronous transfer mode (ATM) cell.

15. In a telecommunication network, a system for transporting circuit emulation data comprising:

an input buffer for receiving the circuit emulation data from a first circuit emulation connection;

an input buffer clock, connected to said input buffer, for generating a packetization signal that controls the transformation of the circuit emulation data into at least one circuit emulation data packet;

data packet multiplexer for multiplexing the at least one circuit emulation data packet into a data packet stream comprising data packets associated at least one other connection;

a shaping clock for generating a data transfer cell shaping clock signal that controls the extraction of a data transfer cell payload from the data packet stream; and data transmission means for transporting the data transfer cell payload to a receiving unit, wherein said input buffer clock generates the packetization signal and controls circuit emulation data packet length as a function of the data transfer cell shaping clock signal.

16. The system of claim 15, wherein said input buffer clock comprises:

a frequency divider responsive to the data transfer cell shaping clock signal.

17. The system of claim 16, wherein said frequency divider divides the data transfer cell shaping clock signal by a variable factor K, which is an operator adjustable function.

18. The system of claim 15, wherein said data packet multiplexer multiplexes the at least one circuit emulation data packet into the data packet stream in accordance with a transmission priority schedule.

19. The system of claim 15, wherein the data transfer cell payload is part of an asynchronous transfer mode (ATM) cell.

20. The system of claim 15, wherein the circuit emulation data is structured data.

21. The system of claim 20, further comprises:

means for inputting a block of structured circuit emulation data from a circuit emulation data connection; and means for generating a structured data pointer if there is no fixed relationship between data block length and data packet length.

22. The system of claim 20, further comprises:

means for inputting a block of circuit emulation data from a circuit emulation data connection; and means for generating a configuration command reflecting a fixed relationship between data block length and data packet length.

23. The system of claim 15, wherein the circuit emulation data is unstructured data.

24. The system of claim 15 further comprising:

input means for receiving the data transfer cell payload;

demultiplexing means, connected to said input means, for extracting the at least one circuit emulation data packet;

output buffer for extracting circuit emulation data from the at least one circuit emulation data packet, and transferring the circuit emulation data to a second circuit emulation connection as a function of a circuit emulation data transfer rate; and clock recovery means, connected to said output buffer, for deriving the circuit emulation data transfer rate based on a data transfer cell arrival rate.

25. The system of claim 24, wherein the data transfer cell arrival rate is a function of the data transfer cell shaping clock signal.

26. The system of claim 24, wherein said clock recovery means comprises:

means for measuring a data transfer cell arrival rate distribution; and means for establishing the circuit emulation data transfer rate as a function of the data transfer cell arrival rate distribution and an operator adjustable variable K.

27. The system of claim 24, wherein said data transfer cell payload is part of an asynchronous transfer mode (ATM) cell.

28. The system of claim 15, wherein said data transmission means comprises:

means for supporting a plurality of traffic service categories.

29. The system of claim 28, wherein the plurality of traffic service categories includes constant bit rate services.

30. The system of claim 28, wherein the plurality of traffic service categories includes variable bit rate services.

31. The system of claim 28, wherein the plurality of traffic service categories includes available bit rate services.

32. The system of claim 28, wherein the plurality of traffic service categories includes unspecified bit rate services.

33. A method for transporting circuit emulation data from a circuit emulation connection to a receiving unit, said method comprising the steps of:

shifting the circuit emulation data into an input buffer from the first circuit emulation connection;

packetizing the circuit emulation data into at least one circuit emulation data packet, in accordance with a packetization clock signal;

multiplexing the at least one circuit emulation data packet into a data transfer cell; and transporting the data transfer cell to a receiving unit in accordance with a data transfer cell shaping clock signal, wherein the packetization clock signal is derived from the data transfer shaping clock signal.

34. The method of claim 33, wherein said method further comprises the step of:

multiplexing at least one data packet into the data transfer cell from a connection other than the circuit emulation connection.

35. The method of claim 34, wherein said method further comprises the step of:

establishing a data transmission priority for each connection; and multiplexing the at least one data packet from the other connection and the at least one circuit emulation data packet from the circuit emulation connection into the data transfer cell, in accordance with the data transmission priority.

36. The method of claim 33, wherein said method further comprises the step of:

frequency dividing the data transfer shaping clock signal by a variable K to derive the packetization clock signal.

37. The method of claim 33, wherein said step of transporting a data transfer cell to a receiving unit comprises the steps of:

transporting a plurality of traffic service categories.

38. The method of claim 37, wherein the plurality of traffic service categories includes constant bit rate services.

39. The method of claim 37, wherein the plurality of traffic service categories includes variable bit rate services.

40. The system of claim 37, wherein the plurality of traffic service categories includes available bit rate services.

41. The system of claim 37, wherein the plurality of traffic service categories includes unspecified bit rate services.

42. The method of claim 33, wherein the data transfer cell is an asynchronous transfer mode (ATM) cell.

43. The method of claim 33, wherein the circuit emulation data is structured data.

44. The method of claim 33, wherein the circuit emulation data is unstructured data.

45. In a telecommunication network, a method for transporting a block of circuit emulation data from a first circuit emulation connection to a second circuit emulation connection, said method comprising the steps of:

shifting the circuit emulation data into an input buffer as a function of a service clock rate;

packetizing the circuit emulation data into at least one circuit emulation data packet having a length that is governed by a packetization clock rate;

multiplexing the at least one circuit emulation data packet into a data transfer cell; and transporting the data transfer cell to a receiving unit in accordance with a data transfer cell shaping clock rate, wherein the packetization clock rate is derived from the data transfer shaping clock rate;

receiving the data transfer cell in the receiving unit;

extracting the at least one circuit emulation data packet from the data transfer cell;

recovering the service clock rate; and transferring the circuit emulation data, contained in the at least one circuit emulation data packet, to the second circuit emulation data connection in accordance with the recovered service clock rate.

46. The method of claim 45, wherein said step of recovering the service clock rate comprises the step of:

recovering the service clock rate based on a data transfer cell arrival rate distribution, wherein the data transfer cell arrival rate distribution is a function of the data transfer cell shaping clock rate.

47. The method of claim 46, wherein said step of recovering the service clock rate comprises the steps of:

measuring the data transfer cell arrival rate distribution; and recovering the service clock rate as a function of the measured data transfer cell arrival rate distribution and an operator adjustable variable K.

48. The method of claim 45, wherein said step of recovering the service clock rate comprises the step of:

recovering the service clock rate from an external network clock.

49. The method of claim 45, wherein said step of recovering the service clock rate comprises the step of:

recovering the service clock rate by an adaptive clock recovery method.

50. The method of claim 45, wherein said step of recovering the service clock rate comprises the step of:

recovering the service clock rate by a Synchronous Residual Time-Stamp method.

51. The method of claim 45, further comprising the step of:

generating a structured data pointer if the circuit emulation data is structure data, and if there is no fixed relationship between block length and data packet length.

52. The method of claim 45, further comprising the step of:

generating a data configuration command reflecting a fixed relationship between block length and data packet length, if the circuit emulation data is structured.

* * * * *